May 21, 1935.  R. J. LOUVIAUX  2,002,348
CUTTING TABLE
Filed Nov. 7, 1931  2 Sheets-Sheet 2
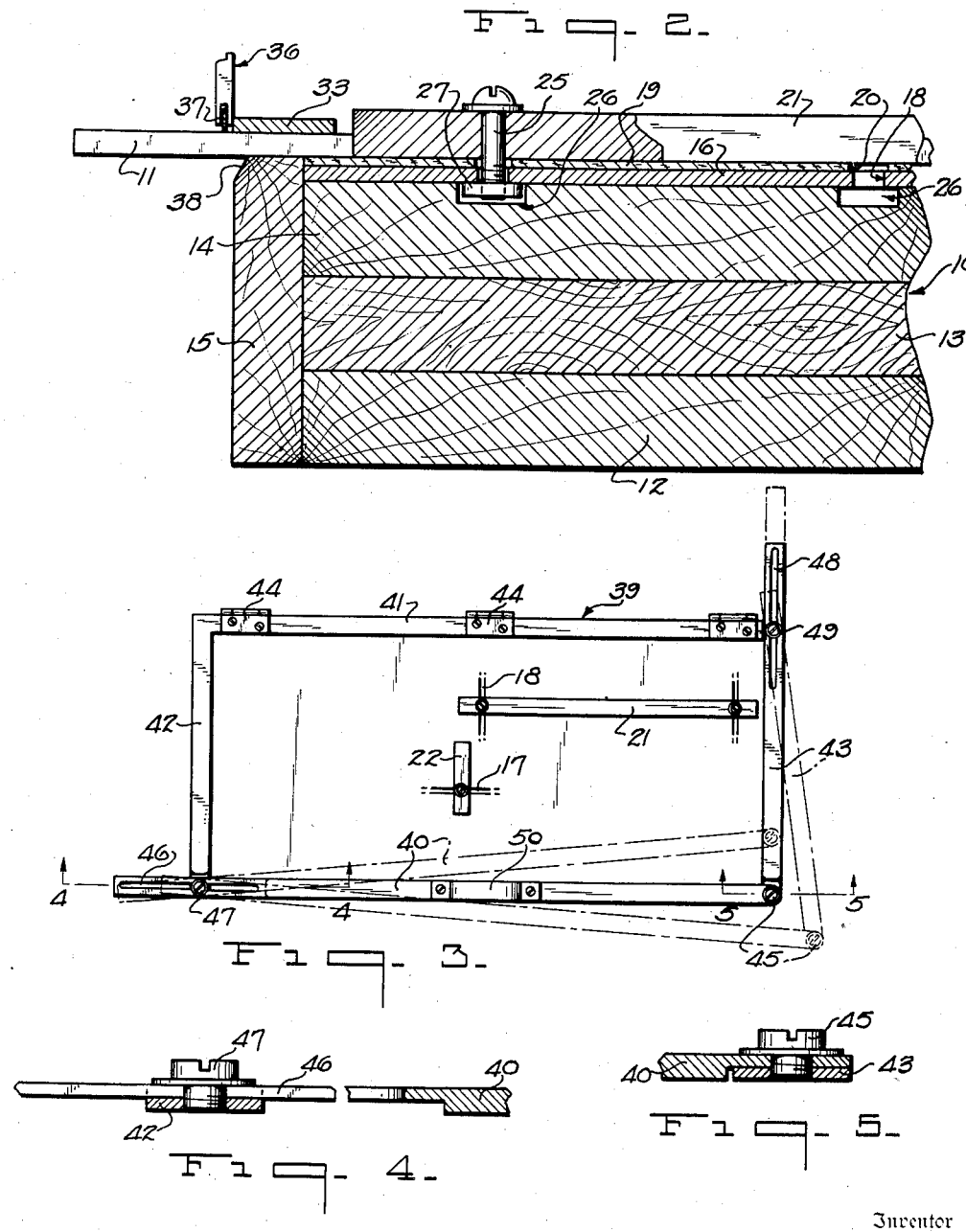
Inventor
Raoul J. Louviaux.
By Frank Fraser
Attorney

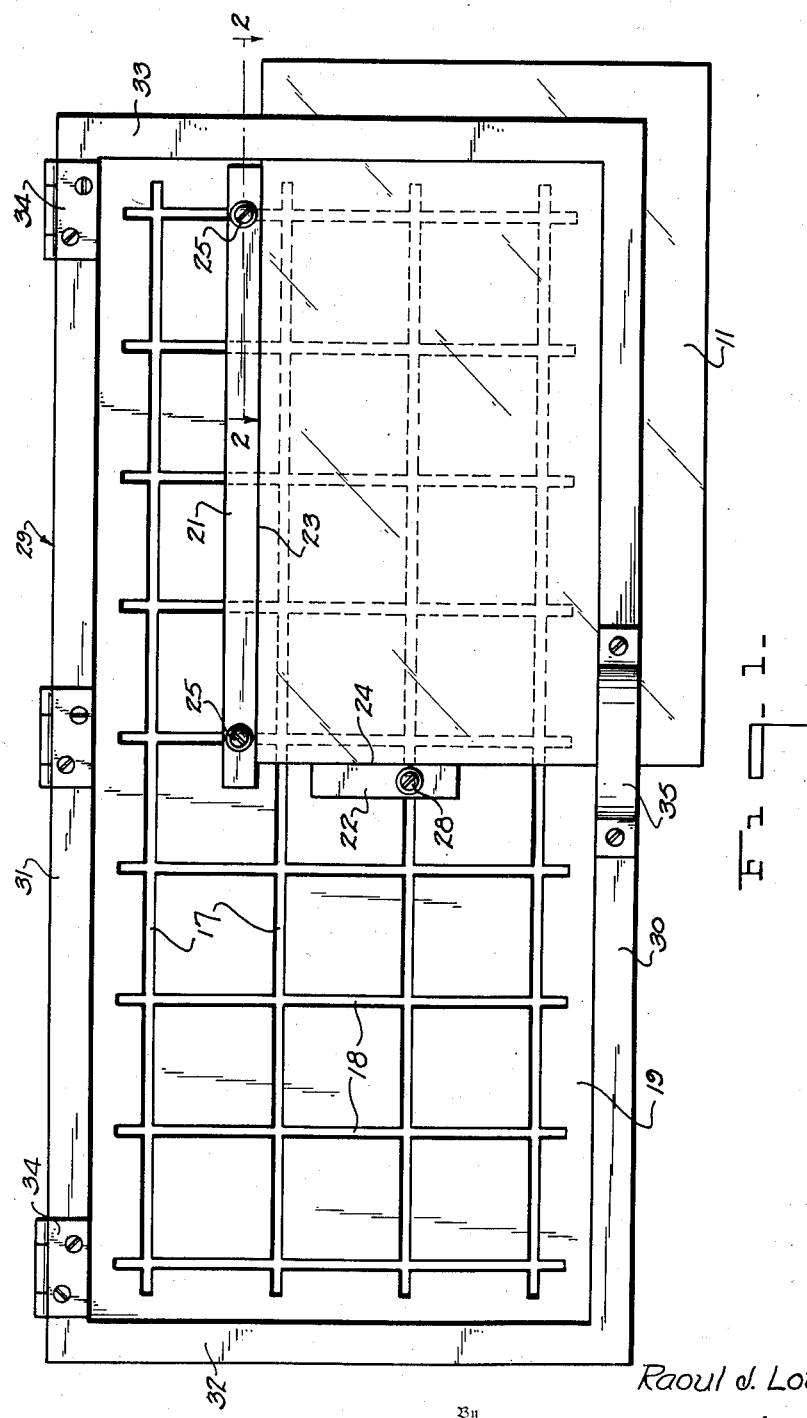

UNITED STATES PATENT OFFICE 2,002,348

CUTTING TABLE

Raoul J. Louviaux, Toledo, Ohio, assignor to Libbey-Owens-Ford Glass Company, Toledo, Ohio, a corporation of Ohio Application November 7, 1931, Serial No. 573,544

8 Claims. (Cl. 33—80)

The present invention relates broadly to improvements in cutting tables generally, and more particularly to such a table adapted primarily for use in the cutting of sheets or plates of glass and the like.

An important object of this invention resides in the provision of a cutting table of simple practical design by the use of which it is possible to effect a rapid and accurate cutting of the glass sheets or plates to a predetermined shape and size.

Another important object of this invention resides in the provision of such a cutting table of the character above described which is adaptable for the cutting of the glass sheets or plates into various shapes and sizes.

Other objects and advantages of the invention will become more apparent during the course of the following description when taken in connection with the accompanying drawings.

In the drawings forming a part of this application and wherein like numerals are employed to designate like parts throughout the same, Fig. 1 is a plan view of a cutting table constructed in accordance with the present invention, Fig. 2 is a section taken substantially on line 2—2 of Fig. 1, Fig. 3 is a plan view of a slightly modified type of cutting table, Fig. 4 is a section taken substantially on line 4—4 of Fig. 3, and Fig. 5 is a section taken substantially on line 5—5 of Fig. 3.

Referring now to the drawings, and particularly with reference first to Figs. 1 and 2, the top of the cutting table herein provided is designated in its entirety by the numeral 10 and is adapted to constitute a horizontal support or bed upon which the glass sheet or plate 11 to be cut is laid. The table top 10 is preferably of a laminated or compound construction, being composed of a plurality, and as here shown three, superimposed layers of wood 12, 13 and 14 respectively, with the grain of the wood in one layer running at an angle to the grain of the wood in the adjacent layer so as to strengthen the compound top as well as to prevent warping of the wood in the respective layers. Each layer may be formed of a single board or, if desired, each layer may be formed of a plurality of strips or pieces shaped so as to lie snugly and closely together. The wooden layers 12, 13 and 14 may be surrounded by a rectangular wooden frame 15.

Secured upon the upper surface of the top 10 is a preferably metallic plate 16 formed with a plurality of spaced parallel longitudinally extending slots 17 and a plurality of spaced parallel transverse slots 18 which intersect and cross the said longitudinally extending slots. The slots 17 preferably extend substantially the entire length of the table while the transverse slots 18 extend substantially the entire width thereof.

Supported upon and secured to the metal plate 16 is a pad 19 preferably of cork or the like, and this pad is likewise provided with a plurality of longitudinally extending and transverse slots similar to and in vertical alignment with the slots 17 and 18 in the metal plate 16. However, the longitudinally extending and transverse slots in the pad 19 are preferably, though not necessarily, slightly wider than the slots 17 and 18 in the metal plate 16 as indicated at 20 in Fig. 2. The glass sheet or plate 11 to be cut is adapted to be supported directly upon the upper surface of the pad 19. The wooden frame 15 preferably projects upwardly beyond the wooden layer 14 of the table top and terminates flush with the upper surface of pad 19.

Mounted upon the top of the table and extending longitudinally thereof is a strip 21 made of any suitable material, while also mounted upon the table is a similar but transversely arranged strip 22. These strips 21 and 22 are adapted to be moved to any desired position upon the table dependent upon the shape and size of sheet to be cut, and are adapted to be engaged by the adjacent edges of the glass sheet or plate to effect proper positioning thereof during cutting. For instance, as here shown, the rear longitudinal edge 23 of the glass sheet 11 abuts the strip 21, while the left hand end edge 24 of the sheet abuts strip 22.

In order to provide for the movement of the strip 21 to the desired position upon the table, the said strip is carried by one or a plurality of vertical bolts 25, each of which passes downwardly through the said strip and also through certain of the transverse slots 18 in the pad 19 and plate 16, the lower end of the bolt being received within a recess 26 in the top of the table and having threaded thereupon a nut 27. Upon loosening of the nuts 27 by rotation of bolts 25, the wooden strip 21 can be moved either transversely of the table or longitudinally thereof due to the fact that the longitudinal and transverse slots 17 and 18 intersect and cross one another. It will, of course, be understood that the recesses 26 in the top of the table extend both longitudinally and transversely thereof beneath and in vertical alignment with the slots 17 and 18 in metal plate 16.

The strip 22 may likewise be secured in fixed position by a bolt 28 similar to bolts 25 so that this strip can also be moved both longitudinally and transversely of the table, during which time the bolt 28 slides along within the slots 17 or 18.

Carried by the table top 10 is a rectangular frame 29 comprising the front and rear longitudinally extending members 30 and 31 and the connecting transverse end members 32 and 33. This frame may be hinged to the top of the table at the rear thereof by a plurality of hinges 34 and may also be provided with a handle 35 to facilitate raising and lowering thereof. The frame 29 is preferably of such a size that, when in lowered position, it will be disposed directly above the wooden frame 15.

In the cutting of a glass sheet or plate 11 on the cutting table above described, the strips 21 and 22 are first secured upon the table in the proper positions to give the desired size of cut and, by reason of the bolts 25 and 28 operating within slots 17 and 18, the said strips may be moved either longitudinally or transversely of said table. The strips 21 and 22 are so arranged that the distance between the inner edge of the strip 21 and the outer edge of the front member 30 of frame 29 is substantially equal to the width of sheet desired, while the distance between the inner edge of strip 22 and the outer edge of the end member 33 of frame 29 is substantially equal to the length of sheet to be cut. The frame 29 is then raised and the glass sheet 11 laid upon the top of the table, with the rear edge 23 thereof in engagement with strip 21 and the end edge 24 thereof in engagement with strip 22. The frame 29 is then lowered to rest upon the sheet. When the sheet is so positioned, it will be seen that the same projects outwardly beyond the frame members 30 and 33, and it is these projecting portions of the sheet which are to be removed. The cutting of the glass sheet may then be effected with the aid of an ordinary hand cutter 36 including the usual steel cutting wheel or diamond 37, said sheet being scored by drawing the cutter along and in engagement with the outer edges of the frame members 30 and 33 which serve as the straight edge. After the sheet has been scored, it is adapted to be broken along the score lines in the usual fashion and, to facilitate this breaking of the sheet, upper corner of the frame 15 may be bevelled as indicated at 38. Of course, the cutting wheel or diamond which is used to score the sheet will be spaced slightly outwardly of the frame as shown in Fig. 2, and this distance, which is usually approximately one-sixteenth of an inch, must be taken into consideration when initially positioning the strips 21 and 22 upon the table.

From the above, it will be apparent that there has been provided a cutting table of simple, practical design by the use of which glass sheets or plates may be rapidly and accurately cut to a predetermined shape and size. The cutting table herein provided is particularly desirable for use in the cutting of a large number of sheets or plates of the same size. In other words, after the strips 21 and 22 have been properly adjusted upon the table, any desired number of sheets can be cut without further adjustment, with the result that the necessity of measuring each individual sheet and then scoring the same with the aid of a conventional straight edge is eliminated. This cutting table is also particularly advantageous for us in the cuttting of relatively small sheets or pieces of glass, and especially those that must be cut to within fractions of an inch.

The present invention also contemplates the provision of a cutting table which is adaptable for the cutting of glass sheets or plates of varying shapes and sizes. Thus, this may be accomplished by substituting for the rigid rectangular frame of Fig. 1 an adjustable frame such as shown in Figs. 3, 4 and 5. The cutting table disclosed in Fig. 3 is of the same construction and arrangement as described hereinabove, with the exception of the adjustable frame which is designated in its entirety by the numeral 39. This frame comprises the front and rear longitudinally extending members 40 and 41 and the end members 42 and 43. The rear longitudinally extending member 41 is hinged to the top of the table by means of hinges 44, and the end member 42 is rigidly connected with member 41. However, the adjacent ends of the end member 41 and front member 40 overlap one another and are pivotally connected together by a screw 45. The front member 40 is further provided at its opposite end with a longitudinally extending slot 46 through which projects a screw 47 secured to the end member 42. The opposite end of the end member 43 is likewise provided with a longitudinally extending slot 48 through which is received a screw 49 secured to the adjacent end of member 41. With such a construction, and due to the endwise sliding movement of the frame members 40 and 43, coupled with the fact that they are pivoted together as at 45, will permit of them being adjusted to assume various positions as shown by the broken lines in Fig. 3, with the result that it is possible to vary the contour of the frame 39 and thereby effect the cutting of the glass sheets into different shapes and sizes. The frame 39 may also be provided with a handle 50 to facilitate raising and lowering thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A cutting table for sheet material, including a substantially horizontal top upon which the sheet to be cut is adapted to rest, a plurality of members secured to said top and against which said sheet is adapted to abut to effect proper positioning of the latter, means for mounting said members so that they are adjustable independently of and relative to one another both longitudinally and transversely of the table, and a frame hinged to the table and adapted to rest upon the sheet, with the outer edges thereof acting as a guide for the cutting tool.

2. A cutting table for sheet material, including a substantially horizontal top upon which the sheet to be cut is adapted to rest, said top being provided with a plurality of longitudinally extending spaced parallel slots and a plurality of spaced parallel transverse slots which intersect and cross said longitudinally extending slots, a plurality of members mounted upon said top and against which said sheet is adapted to abut to effect proper positioning of the latter, means carried by said members and received within certain of said slots whereby the said members may be guided both longitudinally and transversely of the table, and a frame adapted to rest upon the sheet, with the outer edges thereof acting as a guide for the cutting tool.

3. A cutting table for sheet material, including a substantially horizontal top upon which the sheet to be cut is adapted to rest, means secured to said top and engageable by said sheet to effect proper positioning of the latter, and a frame adapted to rest upon the sheet and acting as a guide for the cutting tool, said frame being composed of a plurality of members adjustable relative to one another and independently of said positioning means to vary the contour thereof.

4. A cutting table for sheet material, including a substantially horizontal top upon which the sheet to be cut is adapted to rest, a plurality of stop members carried by said top and against which said sheet is adapted to abut to effect proper positioning of the latter, and a frame adapted to rest upon the sheet, with the outer edges thereof acting as a guide for the cutting tool, said frame being composed of a plurality of rigid members and a plurality of movable members connected to said rigid members and adjustable with respect thereto and also relative to one another and independently of said stop members whereby the contour of said frame may be varied.

5. A cutting table for sheet material, including a substantially horizontal top upon which the sheet to be cut is adapted to rest, a plurality of members carried by said top and against which said sheet is adapted to abut to effect proper positioning of the latter, and a frame adapted to rest upon the sheet, with certain edges thereof acting as a guide for the cutting tool, said frame being composed of spaced longitudinally extending front and rear members and transverse end members, the rear longitudinally extending member being rigidly connected at one end with the inner end of one of said end members, the adjacent ends of the longitudinally extending front member and the other end member being pivotally connected together, means for connecting the opposite end of the front member to the outer end of the first-mentioned end member to cause endwise sliding movement of the former relative to the latter, and means for connecting the rear end of the second-mentioned end member with the corresponding end of the rear member to cause endwise sliding movement of the former relative to the latter.

6. A cutting table for sheet material, including a substantially horizontal top upon which the sheet to be cut is adapted to rest, a plurality of members carried by said top and against which said sheet is adapted to abut to effect proper positioning of the latter, and a frame adapted to rest upon the sheet, with certain edges thereof acting as a guide for the cutting tool, said frame being composed of spaced longitudinally extending front and rear members and transverse end members, the rear longitudinally extending member being rigidly connected at one end with the inner end of one of said end members, the adjacent ends of the longitudinally extending front member and of the other end member being pivotally connected together, the outer ends of said front and last-mentioned end member being formed with longitudinally extending slots, and fastening elements carried by the outer ends of said rear member and first-mentioned end member and received within the slots in the second-mentioned end member and front member respectively.

7. A cutting table for sheet material, including a substantially horizontal top upon which the sheet to be cut is adapted to rest, said top being provided with a plurality of longitudinally extending spaced parallel slots and a plurality of spaced parallel transverse slots which intersect and cross said longitudinally extending slots, a plurality of members mounted upon said top and against which said sheet is adapted to abut to effect proper positioning of the latter, means carried by said members and received within certain of said slots whereby the said members may be guided both longitudinally and transversely of the table, and means adapted to rest upon the sheet and acting as a guide for the cutting tool.

8. A cutting table for sheet material, including a substantially horizontal top upon which the sheet to be cut is adapted to rest, said top being provided with a plurality of longitudinally extending spaced parallel slots and a plurality of spaced parallel transverse slots which intersect and cross said longitudinally extending slots, a plurality of members mounted upon said top and against which said sheet is adapted to abut to effect proper positioning of the latter, means carried by said members and received within certain of said slots whereby the said members may be guided both longitudinally and transversely of the table, and a frame adapted to rest upon the sheet and acting as a guide for the cutting tool, said frame being composed of a plurality of members adjustable relative to one another to vary the contour thereof.

RAOUL J. LOUVIAUX.